US011354439B2

(12) United States Patent
Sofia et al.

(10) Patent No.: US 11,354,439 B2
(45) Date of Patent: Jun. 7, 2022

(54) CONTENT CONTROL THROUGH THIRD-PARTY DATA AGGREGATION SERVICES

(71) Applicant: International Business Machines Corporation, Armonk, NY (US)

(72) Inventors: Anthony Thomas Sofia, Hopewell-Junction, NY (US); Michael Joseph Jordan, Woodstock, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 101 days.

(21) Appl. No.: 16/891,149

(22) Filed: Jun. 3, 2020

(65) Prior Publication Data

US 2021/0383020 A1     Dec. 9, 2021

(51) Int. Cl.
| *G06F 21/62* | (2013.01) |
| *G06F 21/60* | (2013.01) |
| *G06F 21/78* | (2013.01) |
| *G06F 11/30* | (2006.01) |
| *G06F 12/14* | (2006.01) |

(52) U.S. Cl.
CPC ........ *G06F 21/6254* (2013.01); *G06F 21/602* (2013.01); *G06F 21/6272* (2013.01); *G06F 21/78* (2013.01); *G06F 2221/0753* (2013.01)

(58) Field of Classification Search
CPC .............. G06F 21/6254; G06F 21/602; G06F 21/6272; G06F 21/78; G06F 2221/0753
See application file for complete search history.

(56) References Cited

U.S. PATENT DOCUMENTS

| 7,142,676 | B1* | 11/2006 | Hillier ................... H04L 9/0894 |
| | | | 713/153 |
| 9,189,777 | B1* | 11/2015 | Dickinson ............. G07F 7/1016 |
| 9,576,147 | B1* | 2/2017 | McClintock ........ H04L 63/0428 |
| 10,909,264 | B2* | 2/2021 | Yamaoka ............. G06F 21/6245 |
| 2007/0038862 | A1* | 2/2007 | Noble ................. G06F 21/6209 |
| | | | 713/156 |

(Continued)

FOREIGN PATENT DOCUMENTS

| CN | 102664933 A | 9/2012 |
| CN | 102724647 A | 10/2012 |

(Continued)

OTHER PUBLICATIONS

International Search Report and Written Opinion for Application No. PCT/CN2021/094033; International Filing Date: May 17, 2021; dated Aug. 17, 2021, 9 pages.

*Primary Examiner* — Darshan I Dhruv
(74) *Attorney, Agent, or Firm* — Cantor Colburn LLP; Edward Wixted

(57) ABSTRACT

Aspects include receiving a request from a user to access data that was acquired by a third-party from a data owner, the data in an encrypted format unreadable by the user. In response to receiving the request from the user to access the data, a third-party key from the third-party is requested and a data owner key from the data owner is requested. The third-party key and the data owner key are applied to the data in the encrypted format to generate the data in an unencrypted format readable by the user. The user is provided with access to the data in the unencrypted format.

17 Claims, 6 Drawing Sheets

(56) References Cited

U.S. PATENT DOCUMENTS

| | | |
|---|---|---|
| 2012/0130723 A1 | 5/2012 | Bhattacharjee |
| 2014/0019753 A1* | 1/2014 | Lowry .................. H04L 9/0894 |
| | | 713/155 |
| 2014/0059352 A1* | 2/2014 | Haga ...................... G05B 15/02 |
| | | 713/171 |
| 2014/0108258 A1 | 4/2014 | Williams |
| 2014/0150060 A1 | 5/2014 | Riley |
| 2017/0230352 A1 | 8/2017 | Chen |
| 2020/0134201 A1* | 4/2020 | Bansal .................. H04L 9/3297 |
| 2021/0034779 A1* | 2/2021 | Signorini .............. G06F 21/604 |
| 2021/0176050 A1* | 6/2021 | Lidzborski .............. H04L 63/06 |
| 2021/0182418 A1* | 6/2021 | Oqaily ...................... H04L 9/14 |
| 2021/0344484 A1* | 11/2021 | Pasquali ............... H04L 9/3213 |

FOREIGN PATENT DOCUMENTS

| | | | |
|---|---|---|---|
| CN | 103179114 A | 6/2013 | |
| CN | 103763319 A | 4/2014 | |
| WO | WO-2013152383 A1 * | 10/2013 | ........... H04L 9/0825 |
| WO | WO-2020183319 A1 * | 9/2020 | ......... G06F 21/6254 |
| WO | WO-2021069112 A1 * | 4/2021 | ........... G06F 21/602 |

\* cited by examiner

US 11,354,439 B2

CONTENT CONTROL THROUGH THIRD-PARTY DATA AGGREGATION SERVICES

BACKGROUND

The present invention generally relates to computer systems, and more specifically, to providing content control through third-party data aggregation services.

A common purpose of data aggregation is to gain more information about particular groups of people based on specific variables such as age, profession, or income. A data broker, or data aggregation service, typically aggregates information from a variety of sources; processes the data to enrich, cleanse, or analyze it; and licenses the processed data to other organizations. Some data brokers collect personal information about consumers from a variety of public and non-public sources and sell that information to other data brokers or data users. Data can be collected from sources such as public records, online activity, and purchase history and then sold to other companies for marketing purposes.

SUMMARY

Embodiments of the present invention are directed to providing content control through third-party data aggregation services. A non-limiting example method includes receiving a request from a user to access data that was acquired by a third-party from a data owner, the data in an encrypted format unreadable by the user. In response to receiving the request from the user to access the data, a third-party key from the third-party is requested and a data owner key from the data owner is requested. The third-party key and the data owner key are applied to the data in the encrypted format to generate the data in an unencrypted format readable by the user. The user is provided with access to the data in the unencrypted format.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
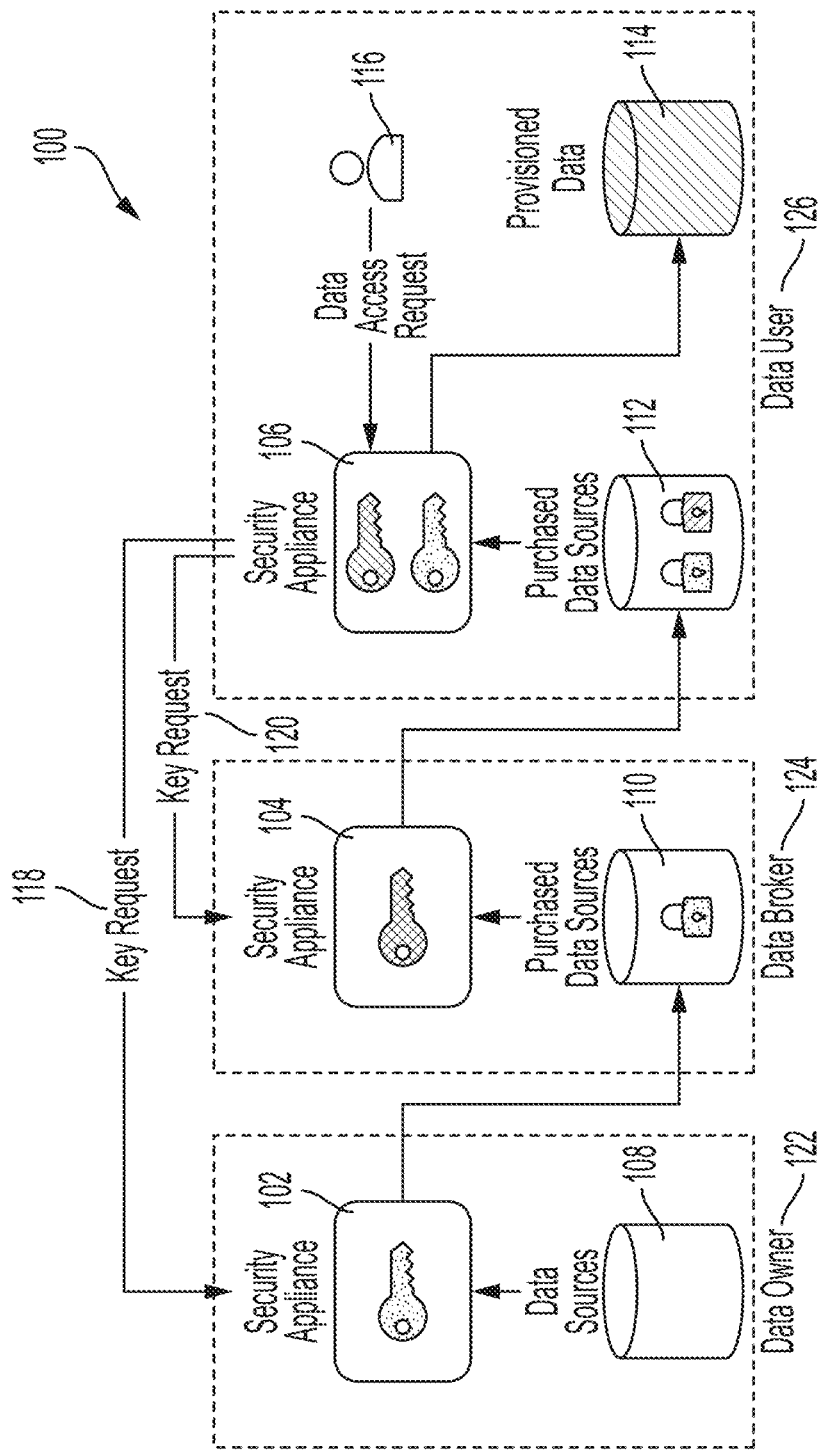
FIG. 1 depicts a block diagram of a system for providing content control through third-party data aggregation services according to one or more embodiments of the present invention.

The diagrams depicted herein are illustrative. There can be many variations to the diagrams, or the operations described therein without departing from the spirit of the invention. For instance, the actions can be performed in a differing order or actions can be added, deleted or modified. Also, the term "coupled", and variations thereof describe having a communications path between two elements and do not imply a direct connection between the elements with no intervening elements/connections between them. All of these variations are considered a part of the specification.

DETAILED DESCRIPTION

One or more embodiments of the present invention provide content control through third-party data aggregation services. In accordance with one or more embodiments of the present invention, secure third-party data aggregation is provided using a system of security appliances and protocols to allow control of data to be maintained by both data owners and data brokers.

Data brokers often buy data from multiple data owners and then create data sets that span the data that they purchased. These data sets are then re-sold to data users who can use the data for various reasons, such as marketing research. Currently, when a data owner provides data to a third-party, such as a data broker, the data broker makes a copy of the data and the data owner completely relinquishes control over what happens next to the data (e.g., who accesses the data) to the data broker. In the case of a breach of the data broker, all data from all parties providing data to the data broker are vulnerable to data exfiltration. Data exfiltration refers to the unauthorized copying, transfer, or retrieval of data. This problem of a data owner not being able to control or track accesses to their data increases in scope when the data broker sells the data to additional parties such as other data brokers or data users.

One or more embodiments of the present invention address one or more of the above shortcomings by allowing a data owner to retain rights in the data that they provide to a third-party, such as a data broker, including controlling access to their data, using a network of security appliances which are distributed either on-premises with each of the parties having access to the data, or deployed in the cloud for some of the parties who wish to participate in the data network.

In accordance with one or more embodiments of the present invention, the data broker does not have access to the content of the data it purchases from a data owner. Instead, the data broker has metadata which describes the data, and the content of the data is secured using a key of the data owner. For example, the data broker may know, based on metadata, that content of data that it receives from a data owner includes credit card transactions each including an encrypted customer name, a merchant name, a transaction amount, and an encrypted customer account number. The only way to access the encrypted customer name and the encrypted customer account number is with a key of the data owner whose distribution is controlled by the data owner via, for example, a security appliance of the data owner. In accordance with one or more embodiments of the present invention, the data owner may have different keys giving different levels of access of access to different requestors of the data.

In accordance with one or more embodiments of the present invention, the data broker provides another layer of security and traceability to the data that it purchases from the data owner by applying another encryption key, a data broker key, to the encrypted data that it receives from the data owner. Once the data broker key is applied, the only way to access the encrypted customer name and the encrypted customer account number is with both the key of the data owner and a key of the data broker whose distribution is controlled by the data broker via, for example, a security appliance of the data broker. In these one or more embodiments, both the data owner and the data broker must approve access to the data before it is provided to a data user. Thus, if either the data user or the data broker suffers a data breach, the data is still protected because both keys are required to decrypt the data for use by a data user.

In accordance with one or more embodiments of the present invention, the data owner can also push policy-based controls for views of data which can be used to control the view that the third-parties can see. For example, a third-party may be able to view the entire credit card number or only the first four digits.

In accordance with one or more embodiments of the present invention, the data broker and/or data owner can dynamically restrict access to data in response, for example, to restrict future access to the data. For example, the data owner can dynamically restrict future access by a data user in the event that the data broker violated the data owner's terms of service for the data. The data broker can also restrict future access of data for data users, if, for example, the time period of the use of the data has expired.

In accordance with one or more embodiments of the present invention, the data owner and/or the data broker can have access logs to track who accessed the data. This information can be used, for example, by the data owner to have visibility into how their data is being distributed to third-parties (e.g., data brokers) and data users.

Turning now to FIG. 1, a block diagram 100 of a system for providing content control through third-party data aggregation services is generally shown in accordance with one or more embodiments of the present invention. The block diagram 100 shown in FIG. 1 includes a data owner 122 and its corresponding security appliance 102 and data sources 108, a data broker 124 and its corresponding security appliance 104 and purchased data sources 110, and a data user 126 and its corresponding security appliance 105, purchased data source 112, and provisioned data 114.

The security appliances 102, 104, 106 each contain key material used to encrypt data elements, or data. They can also each communicate with other security appliances and serve them key material to be used to decrypt data elements. As shown in FIG. 1, security appliance 106 communicates with security appliance 102 and security appliance 104 to perform key requests 118 120. In accordance with one or more embodiments of the present invention, the security appliances 102, 104, 106 are implemented by any method known in the art such as, but not limited to servers and/or containers, that do not support user logins or access to the software or memory of the running system. In accordance with one or more embodiments of the present invention, the security appliances 102, 104, 106 are accessed, or communicated with, via application programming interfaces (APIs).

As shown in FIG. 1, the data owner 122 has data, shown in FIG. 1 as data sources 108, that the data owner 122 wishes to monetize. These data sources 108 can include but are not limited to data from an Internet of things (IoT), user data, and/or relational data sources. When the data owner 122 has identified the data that it wants to provide to the data broker 124, the data security appliance 102 of the data owner 122 wraps the data elements that are part of the data, or data set, with metadata that describes the data. The data is then encrypted with a key that is owned by the data owner 122 and sent along with the metadata to the data broker 124, which stores the encrypted data and metadata (e.g., in a database or other storage configuration) as purchased data sources 110.

In accordance with one or more embodiments of the present invention, the data broker 124 does not have access to the data owner key and thus, cannot open or read the data provided by the data owner. In accordance with one or more embodiments of the present invention, the data broker 124 does not know the content, or actual data values, of the data received from the data owner 122. Based on the metadata provided by the data owner, the data broker 124 does know the type of the data contents and the data broker can use the metadata to put that data into catalogs which can then be resold. As shown in FIG. 1, the data broker 124 purchases data sets, shown in FIG. 1 as purchased data sources 110, from one or more data owners 122. These purchased data sources may contain a combination of clear (unencrypted) data as well as anonymized or non-anonymized personally identifiable information (PII). As known the art, PII refers to any data that could potentially be used to identify a particular person such as, but not limited to a full name, a Social Security number, a driver's license number, a bank account number, a pass port number, and/or an email address.

When the data broker 124 sells the data, the data broker 124 repeats the same process that the data owner did, wrapping and encrypting the data elements, but with a key owned by the data broker 124. As shown in FIG. 1, security appliance 104 performs the wrapping and encrypting of the (already encrypted) data received from the data owner 122. When the data is received by the data user 126, it is now encrypted with the owner key and then again with the data broker key. The data user 126 stores the data in a storage location as a purchased data source 112.

In accordance with one or more embodiments of the present invention, when a user 116 wants to use data from the purchased data sources 112, a request for data access is made through the security appliance 106. In response to receiving the request, the security appliance 106 requests keys from both security appliance 102 and security appliance 104. This is shown in FIG. 1 as key request 120 which requests a data broker key from security appliance 104 and key request 118 which requests a data owner key from security appliance 102. In accordance with one or more embodiments of the present invention, from the point of view of the user 116, this is a single atomic operation, where the data requested by the user 116 is decrypted with the data broker key and then with the data owner key. The resulting clear data, or clear data element, is stored as provisioned data 114. The user 116 can use this provisioned data 114 for market research and driving additional revenue in their business offerings.

In accordance with one or more embodiments of the present invention, policy from the data owner 122 can influence if the clear data can be provided to the user 116, or if the data that leaves the security appliance 106 should be masked, redacted, or have some other obfuscation technique applied to it.

In accordance with one or more embodiments of the present invention, in the event that either party, the data owner 122 or data broker 124 no longer want to allow the user 116 to have access to their data, they can remove the access to their respective key for that user 116. The removal can apply to the specific user 116 or to all users of a data user 126 (e.g., in cases where a data user 126 includes a plurality of individual users 116 requesting data access). In addition, the removal can apply to specific time frames with access allowed during other time frames. Alternatively, the data owner 122 or data broker 124 can delete their respective key which would permanently invalidate the data in the purchased data sources 112.

Both the data owner 122 and the data broker 124 can have complex schemes to allow granular access to their data. For example, the data owner 122 can use different keys for different data brokers 124 so that they can invalidate just a single data broker's data. The data broker 124 can also use different keys for different data users 126 so that they can invalidate just a single data set.

Any kind of encryption algorithm involving one or more keys may be utilized to encrypt the data. Examples include, but are not limited to, variants of the advanced encryption scheme (AES), data encryption standard (DES), and/or Rivest, Shamir, and Adleman (RSA) encryption.

Only one third-party, data broker 124, is shown in FIG. 1 between the data owner 122 and the data user 126, however embodiments of the present invention are not limited to data that is processed by a single third-party before it is used by data user 126. In accordance with one or more embodiments of the present invention, there are two or more data brokers 124 each having sequentially applied their own data broker key to the data and each having their own security appliance 104. In this case, the data user 126 will initiate two or more key requests 120 to get two or more data broker keys from the security appliances 104 associated with each of the data brokers 124 along, with key request 118 which requests a data owner key from security appliance 102.

Any of the components shown in FIG. 1 may be coupled to each other via a network. For example, security appliance 102 may be coupled to security appliance 106 and/or purchased data sources 110 via a network. The network(s) may be implemented by any network(s) known in the art such as, but not limited to a local area network (LAN), a direct cable connection, a cloud computing environment such as that shown below in FIG. 4, and/or the Internet.

The embodiments described herein with respect to block diagram 100 of FIG. 1 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments. In addition, the various blocks in FIG. 1 may be configured in different manners than that shown in FIG. 1.

Figure 2:
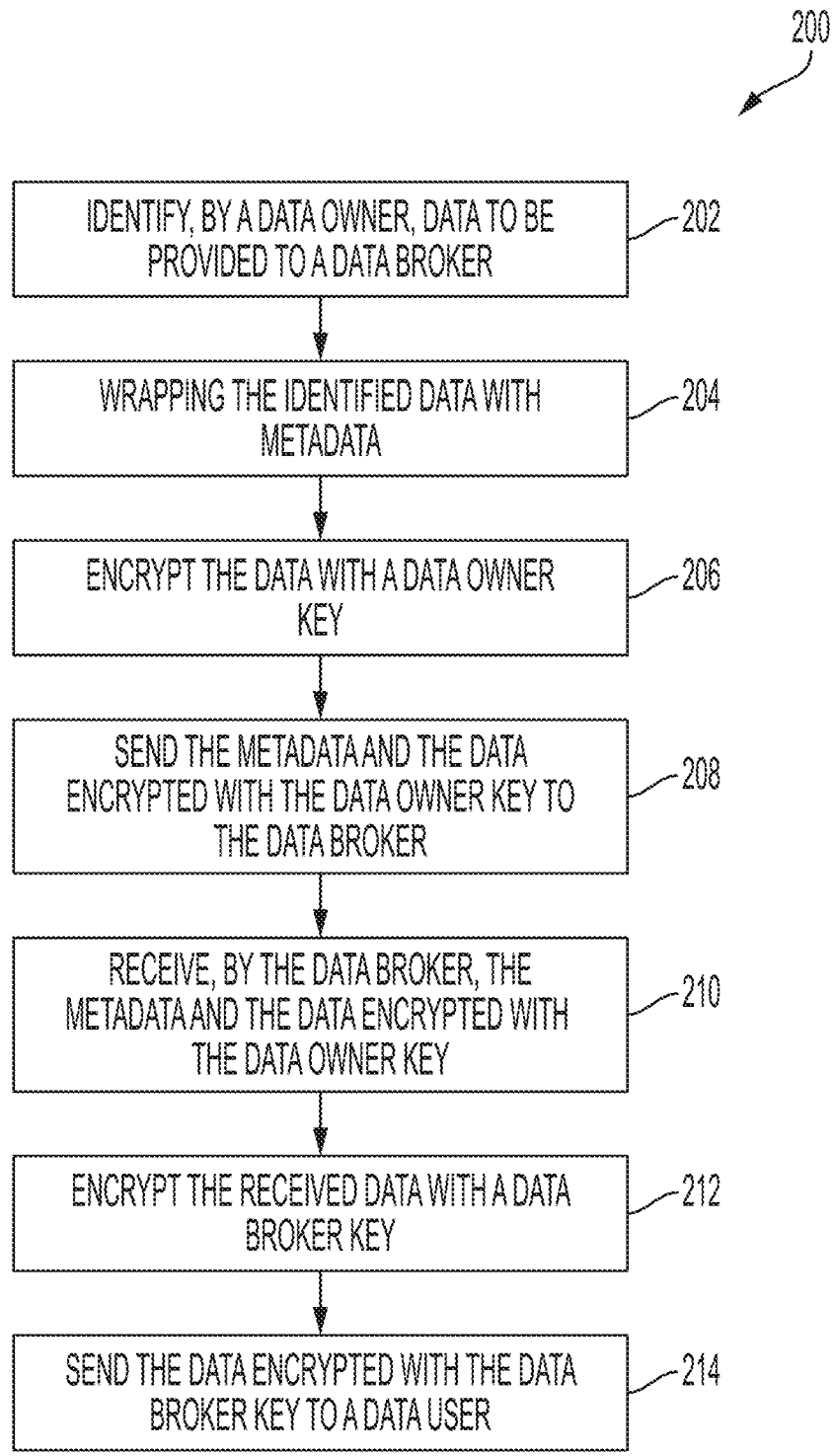
FIG. 2 depicts a flow diagram of generating content that can be controlled through third-party data aggregation services according to one or more embodiments of the present invention.

Turning now to FIG. 2, a flow diagram of a method 200 of generating content that can be controlled through third-party data aggregation services is generally shown according to one or more embodiments of the present invention. All or a portion of the processing shown in blocks 202 through 208 of FIG. 2 can be performed, for example, by security appliance 102 of FIG. 1 executing on processor 605 located on computer 601 of FIG. 6 or executing on a processor located on a cloud computing node 10 of FIG. 4. The process shown in FIG. 2 starts at block 202 with a data owner, such as data owner 122 of FIG. 1, identifying data, such as data sources 108, to be provided to a third-party. The third-party may be, but is not limited to a data broker, such as data broker 124 of FIG. 1. At block 204, the identified data is wrapped with metadata to describe the contents of the data, and at block 206, the data is encrypted with a data owner key. The metadata and the data encrypted with the data owner key are sent to the third-party at block 208. In the example shown in FIG. 2, the third-party is a data broker. In accordance with one or more embodiments of the present invention, a third-party can be any entity that collects and distributes data.

Processing continues at block 210 of FIG. 2. All or a portion of the processing shown in blocks 210 through 214 of FIG. 2 can be performed, for example, by security appliance 104 of FIG. 1 executing on processor 605 located on computer 601 of FIG. 6 or executing on a processor located on a cloud computing node 10 of FIG. 4. At block 210, the metadata and the data encrypted with the data owner key is received by the data broker. The received data may be stored in a storage location such as purchased data sources 110 of FIG. 1. At block 212, the received data encrypted with the data owner key is further encrypted with a data broker key. The data encrypted with both the data owner key and the data broker key is sent to the data user, such as data user 126 of FIG. 1, at block 214. In accordance with one or more embodiments of the present invention, the metadata is also sent to the data user. The data encrypted with both the data owner key and the data broker key can be stored by the data in a storage location, such as purchased data sources 112 of FIG. 1, In accordance with one or more embodiments of the present invention, the metadata is also sent to the data user and can be stored in the storage location.

The process flow diagram of FIG. 2 is not intended to indicate that the operations of the method 200 are to be executed in any particular order, or that all of the operations of the method 200 are to be included in every case. Additionally, the method 200 can include any suitable number of additional operations.

Figure 3:
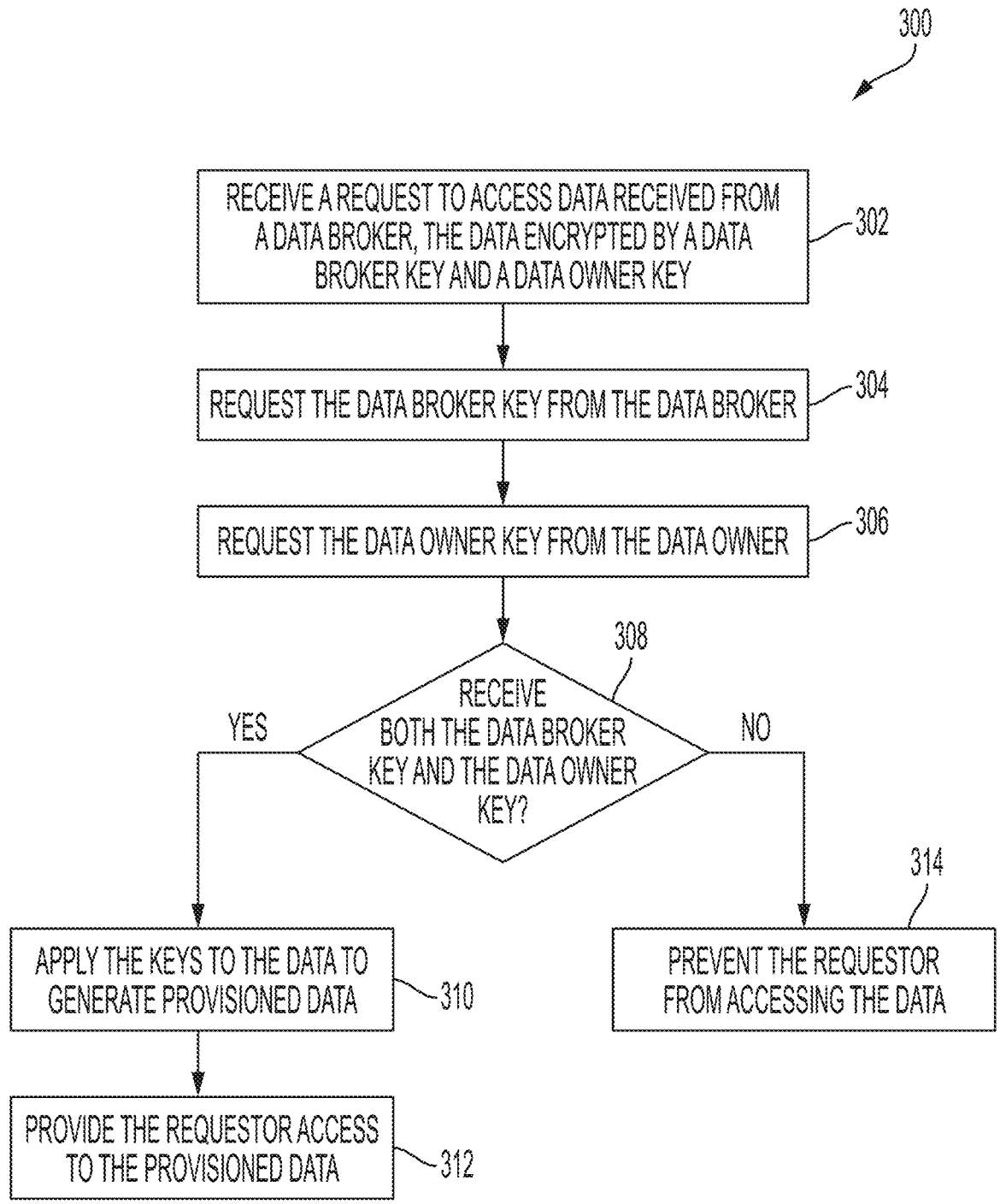
FIG. 3 depicts a flow diagram of providing content control through third-party data aggregation services according to one or more embodiments of the present invention.

Turning now to FIG. 3, a flow diagram of a method 300 of providing content control through third-party data aggregation services is generally shown in accordance with one or more embodiments of the present invention. All or a portion of the processing shown in FIG. 3 can be performed, for example, by security appliance 106 of FIG. 1, executing on processor 605 located on computer 601 of FIG. 6 or executing on a processor located on a cloud computing node 10 of FIG. 4. The processing in FIG. 3 begins at block 302 with receiving a request from a user, such as user 116 of FIG. 1, to access data received from a third-party, such as data broker 124 of FIG. 1. The data that the user is requesting access to is encrypted by both a data broker key and a data owner key and is readable by the user in its current encrypted format. In accordance with one or more embodiments of the present invention, the request is received by a security appliance of the data user, such as security appliance 106 of FIG. 1.

At block 304 of FIG. 3, the security appliance of the data user requests the data broker key from the data broker. In accordance with one or more embodiments of the present invention, the request for the data broker key is made to a security appliance of the data broker, such as security appliance 104 of FIG. 1. In response to receiving the request, the security appliance of the data broker returns the data broker key to the user if it determines that the user is a valid, or authorized, user that should have access to the data. In addition, the security appliance of the data broker can log the access request. As described previously, the security appliance of the data broker can determine that the data broker authorizes the user to have access to the data at one point in time and that the data broker does not authorize access by the user at another point in time. In addition, the scope of the access (e.g., full access, redacted access, etc.) can be modified by the data broker and be different at different points in time. In this manner, the data broker can control who has access to the data even after the data has been sent to a data user.

At block 306, the security appliance of the data user requests the data owner key from the data owner. In accordance with one or more embodiments of the present invention, the request for the data owner key is made to a security appliance of the data owner, such as security appliance 102 of FIG. 1. In response to receiving the request, the security appliance of the data owner returns the data owner key to the user if it determines that the user is a valid, or authorized, user that should have access to the data. In addition, the security appliance of the data owner can log the access request. As described previously, the security appliance of the data owner can determine that the data owner authorizes the user to have access to the data at one point in time and that the data owner does not authorize access by the user at another point in time. In addition, the scope of the access (e.g., full access, redacted access, etc.) can be modified by the data owner and be different at different points in time. In this manner, the data owner can control who has access to the data even after the data has been sent by a data broker to a data user.

At block 308 of FIG. 3, it is determined whether both the data broker key and the data owner key have been received in response to the requests at blocks 304 and 306. If it is determined at block 308 that both the data broker key and the data owner key have been received, then processing continues at block 310. At block 310, the data broker key is applied to the encrypted data to generate data that is encrypted by the data owner key. The data owner key is then applied to the data that is encrypted by the data owner key to generate the data in an unencrypted format that is readable by the user. This data may be stored as provisioned data, such as provisioned data 114 of FIG. 1. At block 312 of FIG. 3, the requesting user is provided with access to the unencrypted, or provisioned data. As described previously, the unencrypted data may include portions of the data, or a subset of the data, that are obfuscated from the user by techniques such as redaction and/or data masking.

If it is determined at block 308 that one or both of the data broker key and the data owner key have not been received, then processing continues at block 314. At block 314, the user can be prevented from accessing the data that it requested access to because keys for decrypting the data are not made available to the user. Though not shown in the embodiment of FIG. 3, the method 300 can include looping back to block 308 from block 314 (e.g., after a set period of time or in response to a detected event) to determine whether the keys have been received.

In one or more embodiments of the present invention, the security appliances of the data broker and the data owner always provide a response to requests from the security appliance of the data user. The responses can include keys or an indication that the user requestor has been denied access to the data.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third-party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third-party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
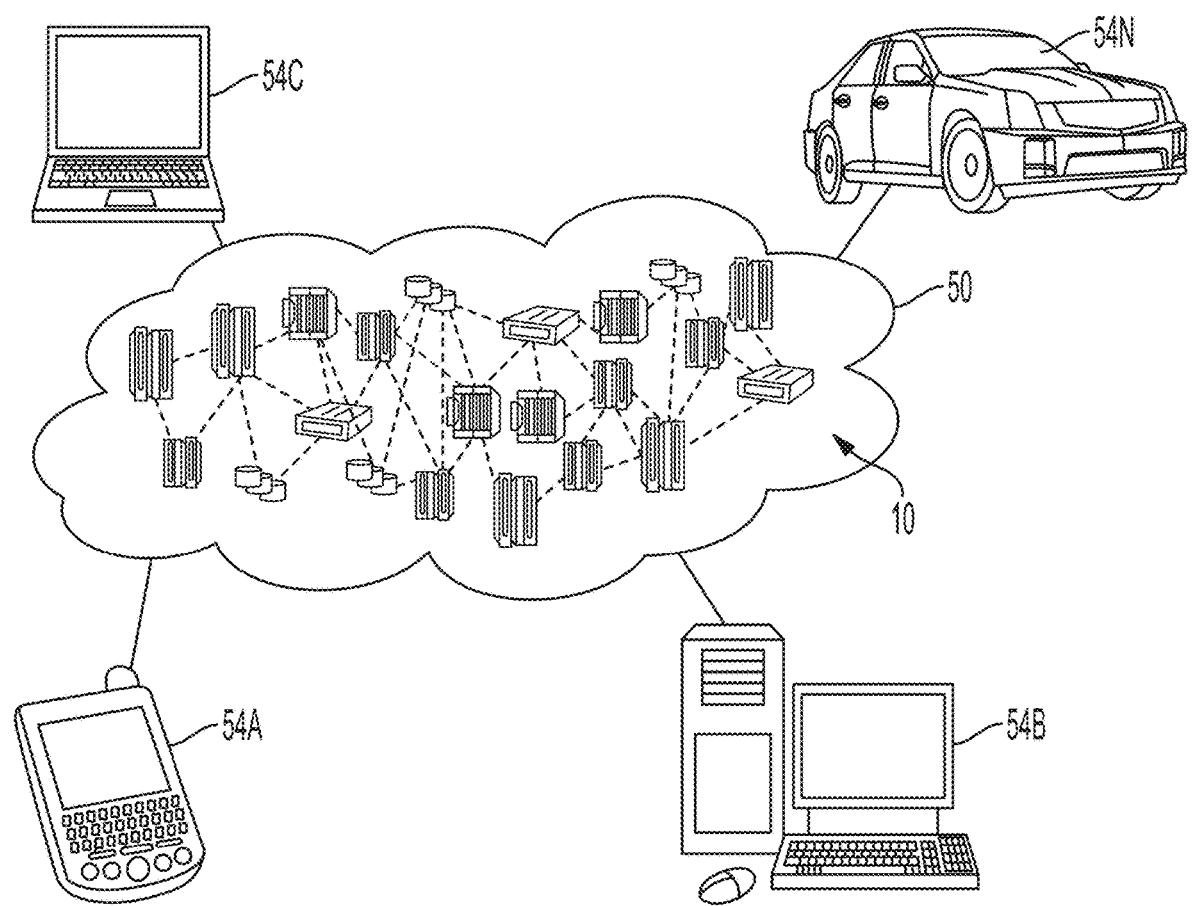
FIG. 4 depicts a cloud computing environment according to one or more embodiments of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
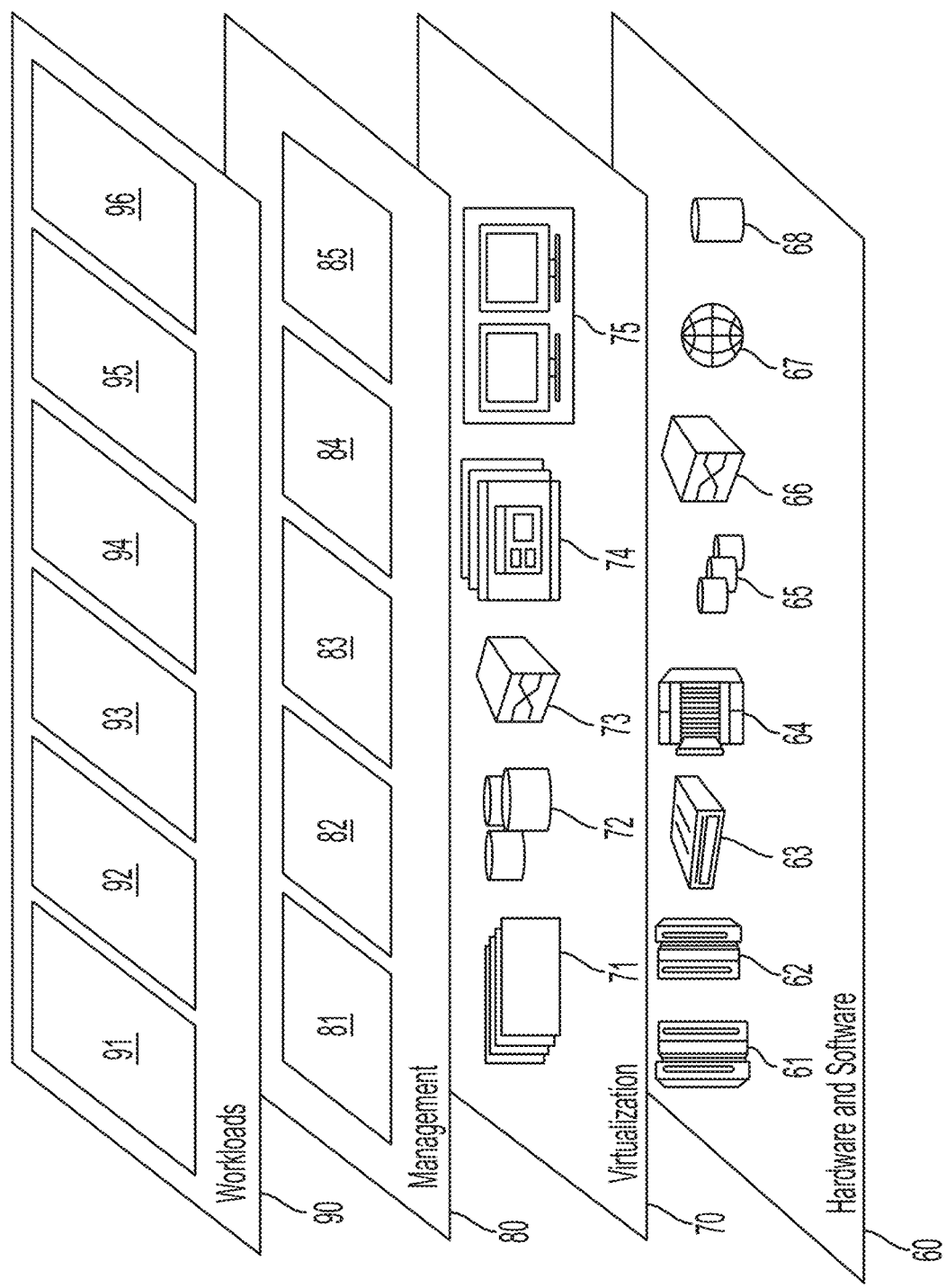
FIG. 5 depicts abstraction model layers according to one or more embodiments of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and breakpoint generation 96.

It is understood that one or more embodiments of the present invention are capable of being implemented in conjunction with any type of computing environment now known or later developed.

Figure 6:
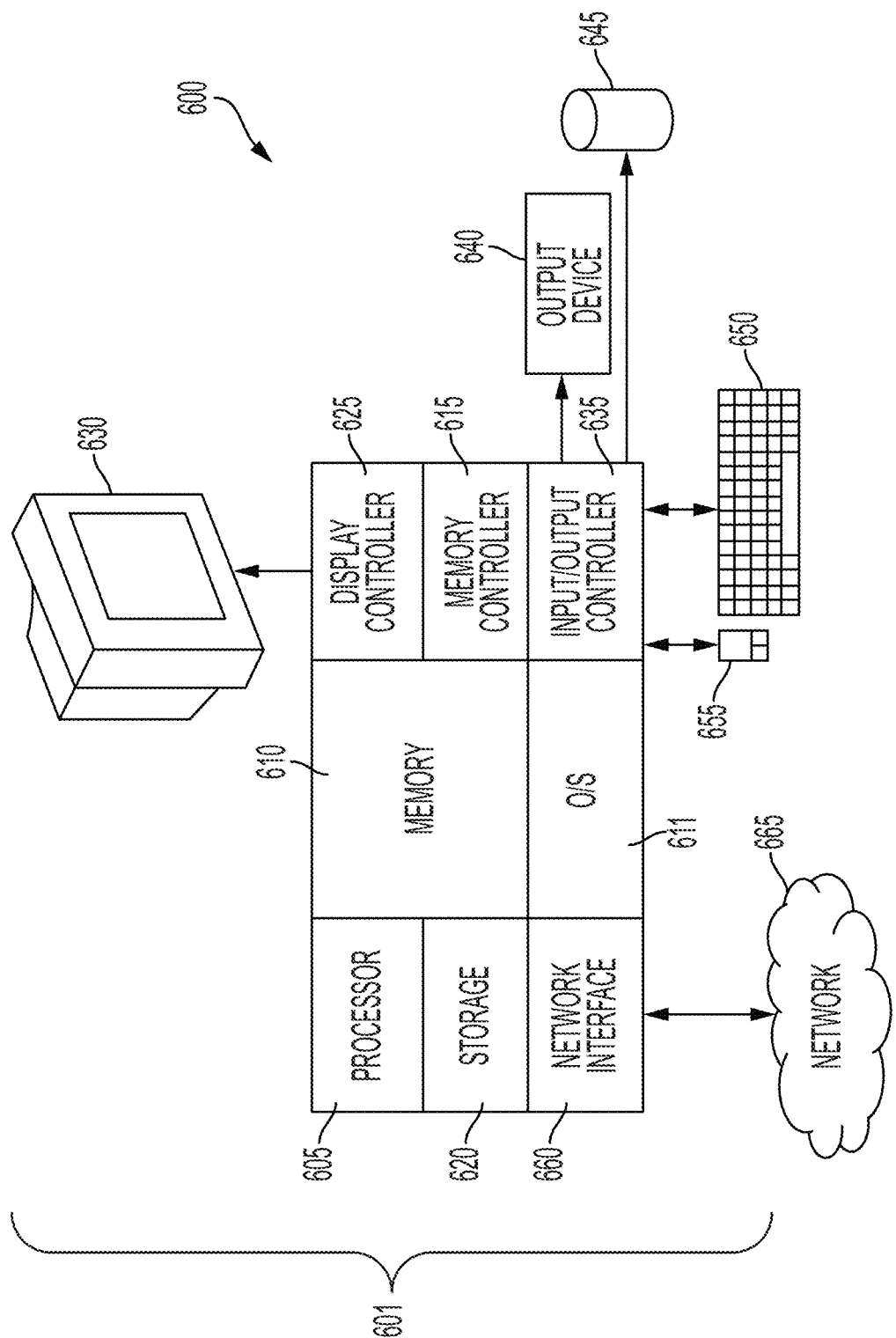
FIG. 6 illustrates a system for providing self-reporting and self-upgrading of enterprise systems according to one or more embodiments of the present invention.

Turning now to FIG. 6, a computer system 600 for providing content control through third-party data aggregation services is generally shown in accordance with one or more embodiments of the present invention. The methods described herein can be implemented in hardware, software (e.g., firmware), or a combination thereof. In one or more exemplary embodiments of the present invention, the methods described herein are implemented in hardware as part of the microprocessor of a special or general-purpose digital computer, such as a personal computer, workstation, minicomputer, or mainframe computer. The system 600 therefore may include general-purpose computer or mainframe 601 capable of running multiple instances of an O/S simultaneously.

In one or more exemplary embodiments of the present invention, in terms of hardware architecture, as shown in FIG. 6, the computer 601 includes one or more processors 605, memory 610 coupled to a memory controller 615, and one or more input and/or output (I/O) devices 640, 645 (or peripherals) that are communicatively coupled via a local input/output controller 635. The input/output controller 635 can be, for example but not limited to, one or more buses or other wired or wireless connections, as is known in the art. The input/output controller 635 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The input/output controller 635 may include a plurality of sub-channels configured to access the output devices 640 and 645. The sub-channels may include fiber-optic communications ports.

The processor 605 is a hardware device for executing software, particularly that stored in storage 620, such as cache storage, or memory 610. The processor 605 can be any custom made or commercially available processor, a central processing unit (CPU), an auxiliary processor among several processors associated with the computer 601, a semiconductor based microprocessor (in the form of a microchip or chip set), a macroprocessor, or generally any device for executing instructions.

The memory 610 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 610 may incorporate electronic, magnetic, optical, and/or other types of storage media. Note that the memory 610 can have a distributed architecture, where various components are situated remote from one another, but can be accessed by the processor 605.

The instructions in memory 610 may include one or more separate programs, each of which comprises an ordered listing of executable instructions for implementing logical functions. In the example of FIG. 6, the instructions in the memory 610 a suitable operating system (OS) 611. The operating system 611 essentially controls the execution of other computer programs and provides scheduling, input-output control, file and data management, memory management, and communication control and related services.

In accordance with one or more embodiments of the present invention, the memory 610 may include multiple logical partitions (LPARs) each running an instance of an operating system. The LPARs may be managed by a hypervisor, which may be a program stored in memory 610 and executed by the processor 605.

In one or more exemplary embodiments of the present invention, a conventional keyboard 650 and mouse 655 can be coupled to the input/output controller 635. Other output devices such as the I/O devices 640, 645 may include input devices, for example but not limited to a printer, a scanner, microphone, and the like. Finally, the I/O devices 640, 645 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 600 can further include a display controller 625 coupled to a display 630.

In one or more exemplary embodiments of the present invention, the system 600 can further include a network interface 660 for coupling to a network 665. The network 665 can be an IP-based network for communication between the computer 601 and any external server, client and the like via a broadband connection. The network 665 transmits and receives data between the computer 601 and external systems. In an exemplary embodiment, network 665 can be a managed IP network administered by a service provider. The network 665 may be implemented in a wireless fashion, e.g., using wireless protocols and technologies, such as WiFi, WiMax, etc. The network 665 can also be a packet-switched network such as a local area network, wide area network, metropolitan area network, Internet network, or other similar type of network environment. The network 665 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 601 is a PC, workstation, intelligent device or the like, the instructions in the memory 610 may further include a basic input output system (BIOS) (omitted for simplicity). The BIOS is a set of essential software routines that initialize and test hardware at startup, start the OS 611, and support the transfer of data among the hardware devices. The BIOS is stored in ROM so that the BIOS can be executed when the computer 601 is activated.

When the computer 601 is in operation, the processor 605 is configured to execute instructions stored within the memory 610, to communicate data to and from the memory 610, and to generally control operations of the computer 601 pursuant to the instructions. In accordance with one or more embodiments of the present invention, computer 601 is an example of a cloud computing node 10 of FIG. 4.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discreet logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method comprising:
receiving a request from a user to access data that was acquired by a third-party from a data owner, the data in an encrypted format unreadable by the user;
in response to receiving the request from the user to access the data:
requesting a third-party key from the third-party; and
requesting, by a security appliance of the user, a data owner key from the data owner, the requesting a data owner key from the data owner comprising communicating with a security appliance of the data owner to request the data owner key, wherein the security appliance of the data owner returns the data owner key in response to determining that the data owner authorizes the user to have access to the data, thereby providing the data owner with control of access to the data after the data has been acquired by the third-party; and
in response to receiving the third-party key and the data owner key:
applying the third-party key and the data owner key to the data in the encrypted format to generate the data in an unencrypted format readable by the user; and
providing the user with access to the data in the unencrypted format.

2. The method of claim 1, wherein the requesting a third-party key from the third-party comprises communicating with a security appliance of the third-party to request the third-party key, wherein the security appliance returns the third-party key in response to determining that the third-party authorizes the user to have access to the data.

3. The method of claim 1, wherein the third-party is a data broker.

4. The method of claim 1, wherein the encrypted format of the data was generated by encrypting the data using the data owner key and encrypting the data encrypted using the data owner key using the third-party key.

5. The method of claim 1, further comprising in response to receiving the request from the user to access the data, logging the request from the user to access the data.

6. The method of claim 1, further comprising in response to providing the user with access to the data in the unencrypted format, logging the providing the user with access to the data in the unencrypted format.

7. The method of claim 1, wherein the data in the unencrypted format includes at least a subset of the data being masked or redacted.

8. A system comprising:
one or more processors for executing computer readable instructions, the computer readable instructions controlling the one or more processors to perform operations comprising:
receiving a request from a user to access data that was acquired by a third-party from a data owner, the data in an encrypted format unreadable by the user;
in response to receiving the request from the user to access the data:
requesting a third-party key from the third-party; and
requesting, by a security appliance of the user, a data owner key from the data owner, the requesting a data owner key from the data owner comprising communicating with a security appliance of the data owner to request the data owner key, wherein the security appliance of the data owner returns the data owner key in response to determining that the data owner authorizes the user to have access to the data, thereby providing the data owner with control of access to the data after the data has been acquired by the third-party; and in response to receiving the third-party key and the data owner key:

applying the third-party key and the data owner key to the data in the encrypted format to generate the data in an unencrypted format readable by the user; and providing the user with access to the data in the unencrypted format.

9. The system of claim 8, wherein the requesting a third-party key from the third-party comprises communicating with a security appliance of the third-party to request the third-party key, wherein the security appliance returns the third-party key in response to determining that the third-party authorizes the user to have access to the data.

10. The system of claim 8, wherein the third-party is a data broker.

11. The system of claim 8, wherein the encrypted format of the data was generated by encrypting the data using the data owner key and encrypting the data encrypted using the data owner key using the third-party key.

12. The system of claim 8, wherein the operations further comprise, in response to receiving the request from the user to access the data, logging the request from the user to access the data.

13. The system of claim 8, wherein the operations further comprise, in response to providing the user with access to the data in the unencrypted format, logging the providing the user with access to the data in the unencrypted format.

14. The system of claim 8, wherein the data in the unencrypted format includes at least a subset of the data being masked or redacted.

15. A computer program product comprising a computer readable storage medium having program instructions embodied therewith, the program instructions executable by one or more processors to cause the one or more processors to perform operations comprising:

receiving a request from a user to access data that was acquired by a third-party from a data owner, the data in an encrypted format unreadable by the user;

in response to receiving the request from the user to access the data:

requesting a third-party key from the third-party; and requesting, by a security appliance of the user, a data owner key from the data owner, the requesting a data owner key from the data owner comprising communicating with a security appliance of the data owner to request the data owner key, wherein the security appliance of the data owner returns the data owner key in response to determining that the data owner authorizes the user to have access to the data, thereby providing the data owner with control of access to the data after the data has been acquired by the third-party; and in response to receiving the third-party key and the data owner key:

applying the third-party key and the data owner key to the data in the encrypted format to generate the data in an unencrypted format readable by the user; and providing the user with access to the data in the unencrypted format.

16. The computer program product of claim 15, wherein the requesting a third-party key from the third-party comprises communicating with a security appliance of the third-party to request the third-party key, wherein the security appliance returns the third-party key in response to determining that the third-party authorizes the user to have access to the data.

17. The computer program product of claim 15, wherein the encrypted format of the data was generated by encrypting the data using the data owner key and encrypting the data encrypted using the data owner key using the third-party key.

* * * * *